United States Patent

Feinleib

[15] 3,665,425

[45] May 23, 1972

[54] INFORMATION STORAGE SYSTEMS UTILIZING AMORPHOUS THIN FILMS

[72] Inventor: Julius Feinleib, Birmingham, Mich.

[73] Assignee: Energy Conversion Devices, Inc., Troy, Mich.

[22] Filed: Mar. 9, 1970

[21] Appl. No.: 17,641

[52] U.S. Cl. ....................340/173, 340/173 LT, 340/173 SS, 340/174 TF, 340/174 YC

[51] Int. Cl. ....................G06f 3/00

[58] Field of Search................350/160; 340/173 LT, 173 SS, 340/174 TF, 174 YC; 346/76 L

[56] References Cited

UNITED STATES PATENTS 3,465,352 9/1969 Carlson ...............................346/76 L

OTHER PUBLICATIONS

Scientific American, Nov. 1969, Vol. 221, No. 5, pgs. 30– 41, of Amorphous Semiconductor Switching, by H. K. Henisch.

*Primary Examiner*—Thomas A. Robinson
*Assistant Examiner*—Jeremiah Glassman
*Attorney*—Edward G. Fiorito

[57] ABSTRACT

The system disclosed herein employs an amorphous semiconductor thin film which is switched between two stable states by applying a focused beam of laser energy. In one state the thin film exhibits specular reflection while in the other state it exhibits diffuse reflection. Data bits or images are recorded by the laser beam on the thin film. This information is retrieved by illuminating the thin film with collimated light, by employing the same laser beam used to record the information, or by recording on a sensitized medium.

18 Claims, 3 Drawing Figures

INVENTOR
JULIUS FEINLEIB
BY
Edward G. Fiorito
ATTORNEY

INVENTOR
JULIUS FEINLEIB
BY Edward G. Fiorito
ATTORNEY

INFORMATION STORAGE SYSTEMS UTILIZING AMORPHOUS THIN FILMS

The present invention may be employed in data processing systems to store large quantities of data, and to randomly or serially access the data to retrieve the information for processing, transmission or other purposes. Such systems have been referred to as optical mass memories and have been found to be suitable for storage of large quantities of data because the data bits can be packed close together providing a high density storage, and because the memory can be optically read at high speeds.

This invention also relates to projectors and viewers for displaying and recording humanly readable information.

Co-pending application Ser. No. 791,441 entitled "METHOD AND APPARATUS FOR PRODUCING, STORING, AND RETRIEVING INFORMATION" by Stanford R. Ovshinsky now U.S. Pat. No. 3,530,441, which is a continuation-in-part of application Ser. No. 754,609 now U.S. Pat. No. 3,545,797, co-pending application Ser. No. 12,622 entitled "OPTICAL MASS MEMORY EMPLOYING AMORPHOUS THIN FILMS" by Julius Feinleib and Robert F. Shaw, and co-pending application Ser. No. 16,697 entitled "INFORMATION STORAGE SYSTEMS" by Julius Feinleib all disclose systems for recording and retrieving information utilizing amorphous semiconductor films which may be switched from one state having a certain atomic structural condition, for example a generally amorphous or disordered state, to a to a second state having another atomic structural condition, for example a crystalline or more ordered state in response to the application of electromagnetic energy, such as a laser beam. The present invention is directed to an improvement in such systems wherein the reflective properties of the amorphous film are utilized. It has been observed that the amorphous film exhibits a different type of reflection when switched between its two stable states. In the generally amorphous or disordered state the film exhibits specular reflection similar to the manner in which light is reflected from a mirror. In the crystalline or more ordered state diffuse reflection is observed, similar to that observed from a granular or rough surface. Information that has been recorded on the amorphous thin film by switching certain regions of the film into the crystalline or more ordered state may be retrieved in a number of ways. A detector may be placed at a position outside the path of electromagnetic energy such as a laser, specularly reflected from the film, while the same energy striking a region of the film in the crystalline or more ordered state produces diffuse reflection scattering in a wide range of directions, including a direction which results in a portion of such energy being collected by the detector. In this manner regions of the thin film can be sampled by a directionally controlled laser beam, for example, and a single detector strategically located for collecting diffuse reflections only, can convert the amount of reflected energy into an electrical signal indicative of the information stored in the amorphous film.

Information may also be retrieved from the film by flooding the entire film with electromagnetic energy, for example, in the form of collimated light in the visible frequency range. By observing the thin film at a viewing area outside the area in which the collimated light is specularly reflected from the thin film, an image of the regions in the crystalline or more ordered state can be viewed since these regions will give off light as a result of diffused reflection. The collimated light may also be reflected from or transmitted through the film and thereafter displayed on a screen or recorded on a sensitized medium.

The present invention permits a single laser beam to be utilized for all three major functions of a storage system, including writing, erasing, and reading information. The laser beam need only include a single frequency component to perform all three functions.

The present invention also permits a single detector to read information out of any point on the amorphous film without mechanically moving either the film, detector, or electromagnetic energy applied to the film.

Still another advantage of the present invention is the ability to use ordinary light to retrieve information from the amorphous film.

Other advantages and features of this invention will be apparent to those skilled in the art upon reference to the accompanying specification, claims, and drawings in which:

Figure 1:
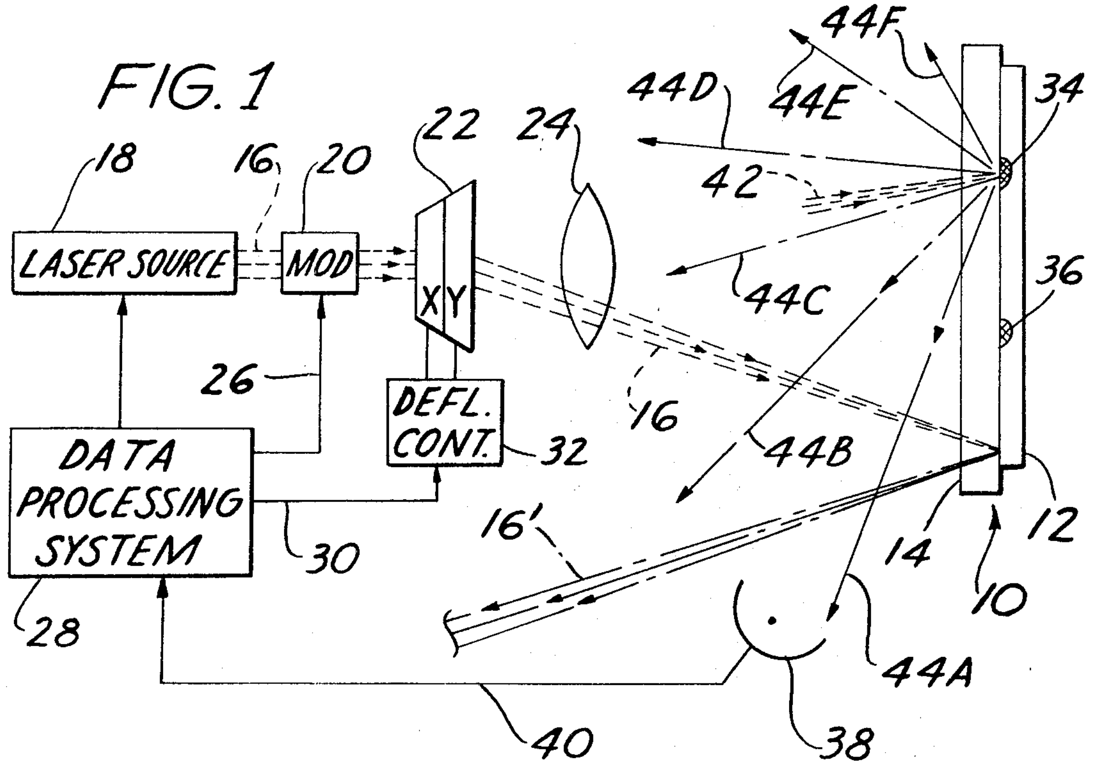
FIG. 1 is a schematic diagram illustrating a system embodying the present invention in which a laser beam is used to retrieve information from the memory film.

The system of FIG. 1 employs a memory unit 10 composed of a thin film of amorphous semiconductor material 12 deposited on a glass substrate 14. A laser beam 16 is generated by a laser source 18 and modulated in intensity by a modulator 20. A two-dimensional deflector 22 directs the beam 16 through a focusing lens 24 onto a particular spot on the amorphous film.

By controlling the intensity of the beam 16 emerging from modulator 20, film 12 can be switched between a generally amorphous or disordered state and a crystalline or more ordered state. As described in more detail in co-pending application Ser. No. 12,622 entitled "OPTICAL MASS MEMORY EMPLOYING AMORPHOUS THIN FILMS" by Julius Feinleib and Robert F. Shaw, film 12 can be switched into the crystalline or more ordered state by applying a relatively large pulse of laser energy which produces joule heating at the interface between film 12 and transparent substrate 14. In order to return the film 12 to the generally amorphous or disordered state a smaller pulse of laser energy is applied. In FIG. 1, modulator 20 controls the pulse duration and amplitude of laser beam 16 to write and erase information on film 12 in response to signals on a line 26 from a data processing system 28. Data processing system 28 also supplies signals on a line 30 to a deflection control 32 which directs the laser beam 16 through lens 24 to a focused spot at any selected region on film 12. Data bits can be read into the memory unit 10 under control of data processing system 28 by generating a matrix of crystalline or more ordered spots such as a pair of typical spots 34 and 36. These spots may have a diameter in the order of 1 micron and be separated by a distance of 2 microns or less providing a two-dimensional matrix of spots capable of storing $10^8$ data bits per square inch. Selected data bits may be erased by converting the corresponding spots, such as 34 and 36, into the generally amorphous or disordered state in response to the application of laser beam 16.

In order to read the data bits from memory unit 10, a detector 38 is mounted in the position illustrated in FIG. 1 to collect laser energy reflected from film 12 and develop a signal on a line 40 which is fed back to data processing system 28. Laser beam 16 after striking film 12 is reflected along a beam path designated 16' in a specular manner. Due to the location selected for mounting detector 38, reflected laser beam 16' passes by detector 38 without producing a signal on line 40. When, however, laser beam 16 is directed to a new location designated by the number 42 in FIG. 1, the energy is focused on spot 34 which produces diffuse reflection illustrated by a group of rays 44 A–F. Accordingly, laser beam 42 is scattered from spot 34 in almost a 180° direction causing some energy, typically represented by ray 44A to be collected by detector 38. The laser beam 16 can be swept through a row or column of data bits such as those represented by spots 34 and 36 and each time the beam 16 strikes a data bit detector 38 collects some reflected energy producing a signal on line 40. By synchronizing the signals on line 30 which control the direction of laser beam 16 with the signals fed back on line 40, the data stored at any given region in the memory unit 10 can be retrieved.

During the read out operation of the system shown in FIG. 1, modulator 20 attenuates the laser beam 16 below the intensity level required to switch the amorphous film 12 between its stable states. All three system functions, including write, erase, and read, can be accomplished using a single frequency component in laser beam 16. Beam 16 need only be capable of being transmitted through substrate 14, and need not be transmitted through amorphous film 12, although it is possible that a portion of the energy in beam 16 may pass through film 12, particularly when it resides in the generally amorphous or disordered state.

Figure 2:
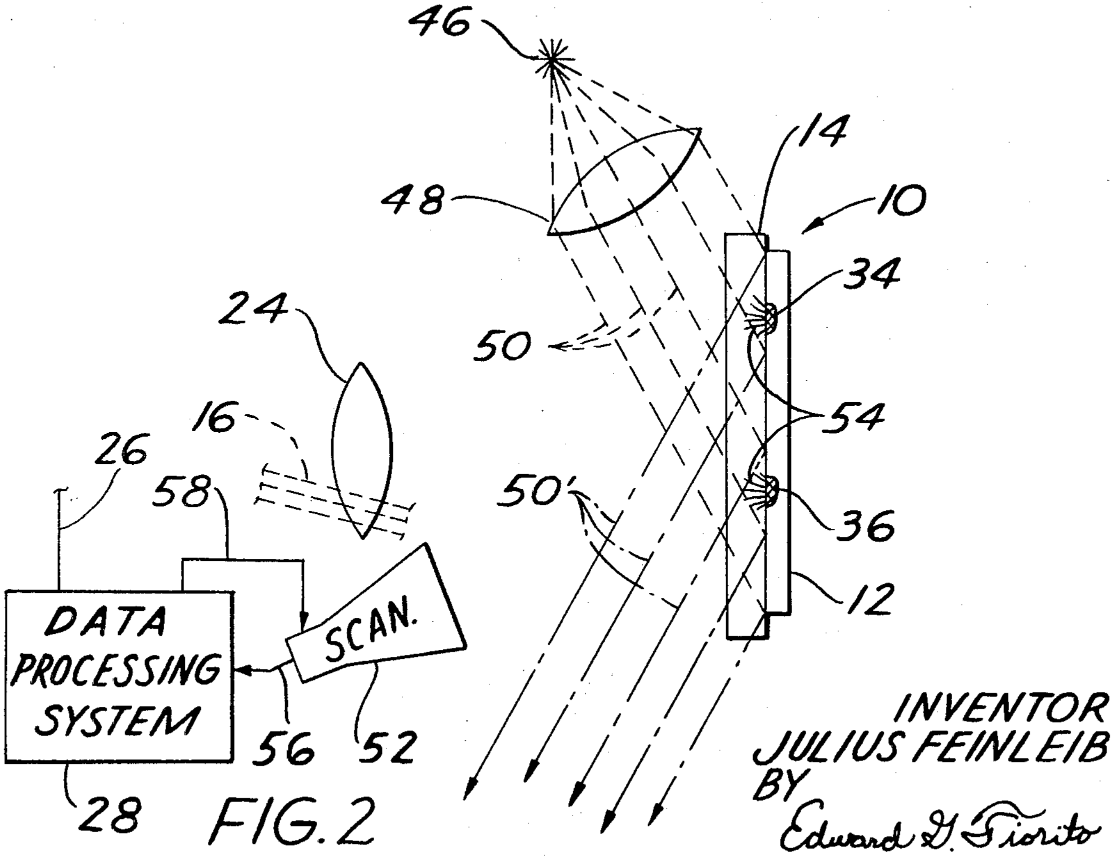
FIG. 2 is a schematic diagram illustrating a portion of the system shown in FIG. 1 wherein ordinary light is utilized to retrieve information from the amorphous film.

FIG. 2 illustrates another technique for retrieving information from the memory unit 10. Like numbers are used to designate similar elements in FIGS. 1, 2, and 3. The data bits represented by spots 34 and 36 in FIG. 2 may be recorded in the same manner and using the same units used to record the data bits in the system of FIG. 1. In order to read the information out, a point source of light 46 is formed by a lens 48 into a collimated beam of light 50 which completely floods film 12. Those rays of beam 50 which strike film 12 in regions which are in the generally amorphous or disordered state are specularly reflected in the manner illustrated by a group of rays 50′ in FIG. 2. A scanner 52 is mounted in a viewing area which is outside the path of rays 50′ and also in a position so that it does not block the laser beam 16 employed in the write and erase mode of operation of the system of FIG. 2. Scanner 52 collects the diffuse light reflected from spots 34 and 36 illustrated by a group of rays 54. Scanner 52 executes a two-dimensional sweep across film 12 in accordance with well known vidicon tube techniques and generates a signal on a line 56 each time the sweep strikes a spot where a data bit is stored, such as spots 34 and 36. The signal on line 56 is fed back to data processing system 28 in a manner similar to the signals on line 40 in FIG. 1. The scanner 52 is controlled by signals on a line 58 from data processing system 28 permitting synchronization and identification of the signals on line 56 so that data can be retrieved from any region of the memory unit 10.

While the present invention has been described with reference to the storage and retrieval of one micro spots representing data bits, other forms of information can be stored in the memory unit 10. For example, spots 34 and 36 may be of a size that are humanly visible, and an array of spots or whole regions may be formed on the film 12 by laser beam 16 so that alpha-numeric characters or other images can be recorded. Gray scale can be achieved by varying the diameter of the spots, such as 34 and 36, or the spacing between spots, and may also be achieved by varying the amount of diffuse reflection produced by a given spot which is dependent upon the depth of penetration of the crystalline or more ordered state of the film 12. Still another way of varying the amount of diffuse reflection from a given spot is to organize the crystalline or more ordered state so that the physical structure, such as the grain size and/or distribution of crystals within the amorphous film 12 controls the intensity of the diffuse light reflected from a given spot, thereby achieving a gray scale image. These variations in spots 34 and 36 can be produced in the system of FIG. 1 by controlling modulator 20 so that the beam 16 is modulated in intensity to produce a varying depth of penetration of the film 12. A similar effect may be produced by regulating deflection control 32 to increase the dwell time of beam 16 at any point on film 12. Additionally, the diameter of the spots 34 and 36 can be made to vary by focusing and de-focusing beam 16 in response to changes in the focal length of lens 24. Additional lenses may be employed to accomplish this adjustment. This form of information can be displayed using the system shown in FIG. 2. By observing the memory unit 10 through the viewing area where scanner 52 is mounted, or any other area where the eye would not receive or obstruct rays 50 or 50′, the diffused light reflected from the regions of amorphous film 12 which are in the crystalline or more ordered state would appear as illuminated bright spots to the human eye. The regions of film 12 which reside in the generally amorphous or disordered state would appear black or dark to the observer since no rays of light would be reflected back to the observer from these regions.

Figure 3:
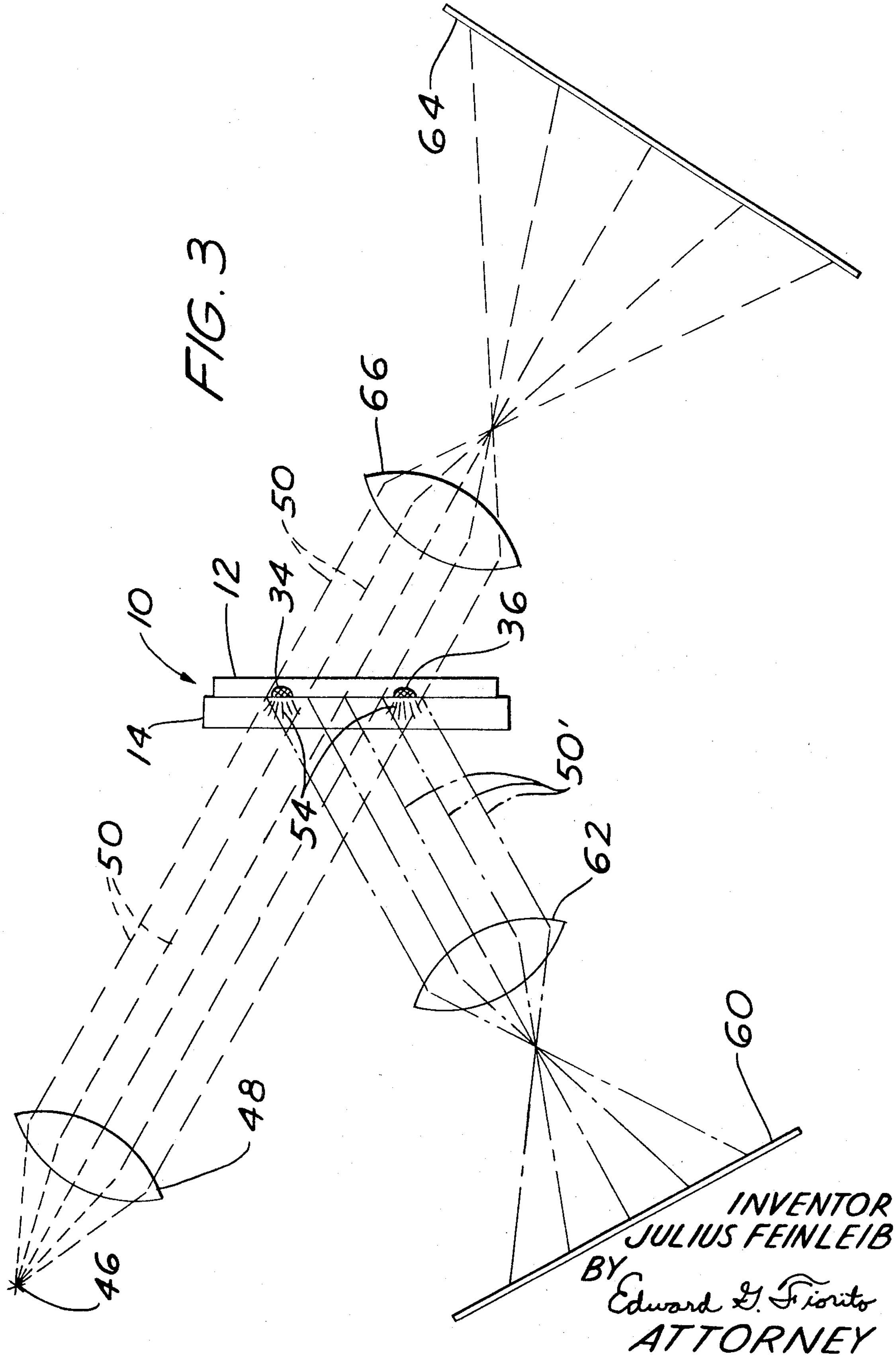
FIG. 3 is a schematic diagram illustrating a portion of the system shown in FIG. 1 wherein ordinary light is projected onto a screen displaying the information stored in the amorphous film.

Another manner in which the present invention can be used to display the information stored in memory unit 10 is to project the reflected rays 50′ onto a screen or sensitized media. This system is shown in FIG. 3. A display screen or sensitized surface 60 such as a photographic or xerographic plate, a thermoplastic or other heat sensitive material, or diazo or other chemically treated paper and lens 62 are located in the path of specularly reflected rays 50′ so that an image is visibly projected onto the surface 60. Since the beam 50 is reflected from spots 34 and 36 in a diffuse manner two corresponding dark regions appear on surface 60.

By selecting the proper wave length, or wave lengths, for point source 46 in FIG. 3 so that a portion or all of the beam 50 is transmitted through the generally amorphous or disordered regions of film 12, the information stored in memory unit 10 can be projected on a screen or sensitized surface 64 similar to surface 60. A lens 66 projects the beam 50 onto surface 64 where once again spots 34 and 36 appear in inverted form as dark regions on the surface 64 due to the diffuse reflection of beam 50 from these regions of film 12. Accordingly surface 64 displays or records the information stored in memory unit 10 by presenting the regions in film 12 exhibiting diffuse reflection as dark spots against a light background.

Another modification can be made to the present invention where the film 12 is substantially transparent to the energy emanating from point source 46. Here, the memory unit 10 can be irradiated from the back side, or side opposite to the laser source 18, and the information stored in the film 12 can be retrieved in the same manner as described with reference to FIG. 2.

While the laser beam 16 as described herein performed the write and erase function in a serial or spot by spot mode of operation, it is possible to record information in parallel, for example, by exposing the amorphous film to laser energy through a mask having alpha-numeric characters or other images cut therein. Additionally, such energy need not be in the form of laser energy, but could be any electromagnetic energy capable of switching the film 12 between its stable states. In the event reversibility is not a desired feature, the electromagnetic energy need only be capable of switching the amorphous film from one of its states to the other.

Various theories may be used to explain why the amorphous film 12 exhibits specular reflection in one state and diffuse reflection in the other. For example, one or more crystals may be formed in the crystalline or more ordered state which due to their multi-facet structure reflect light in many directions. Another explanation may be based upon a change in volume produced when film 12 is switched to the crystalline or more ordered state thereby forming a dish or recession at the interface between film 12 and substrate 14 which could cause light to scatter. Other changes in phase such as a difference in surface roughness between the stable states of the amorphous film 12 may be used to explain the operation of the present invention.

While a single lens is illustrated in FIGS. 1 and 2, a plurality of lenses may be employed to perform the function of focusing laser beam 16.

Numerous other modifications may be made to various forms of the invention described herein without departing from the spirit and scope of the invention.

What is claimed is:

1. An information recording and retrieving system comprising:

a source of electromagnetic energy;

a substrate transparent to said electromagnetic energy;

an amorphous semiconductor film deposited on said substrate and capable of being switched between a first state having a certain atomic structure condition and a second state having a different atomic structure condition in response to said electromagnetic energy, said film exhibiting specular reflection from regions in said first state and diffuse reflections from regions in said second state;

deflection means located between said source and substrate for directing said electromagnetic energy through said substrate onto selected regions of said film;

means for modulating said electromagnetic energy so that said film is switched between said states; and retrieving means responsive to said diffuse reflection for determining the state of said film at said selected regions.

2. The system as defined in claim 1 wherein said retrieving means includes an electromagnetic detector positioned so that diffuse reflection of electromagnetic energy from said film is collected while specular reflection of electromagnetic energy is not collected.

3. The system as defined in claim 1 further characterized by the addition of a lens system located between said deflection means and said substrate for focusing said electromagnetic energy at the interface between said substrate and film.

4. The system as defined in claim 3 wherein said modulating means includes means for lowering the intensity of said electromagnetic energy below that required to switch said film between said states, but sufficient to producer reflection of electromagnetic energy from regions of said film selected by said deflection means, and wherein said retrieving means includes an electromagnetic detector positioned so that said electromagnetic energy reflected from regions of said film in said second state exhibiting diffuse reflection is collected, while said electromagnetic energy reflected from regions of said film in said first state exhibiting specular reflection is not collected.

5. The system as defined in claim 4 wherein said electromagnetic energy is a coherent parallel ray beam of laser energy.

6. The system as defined in claim 1 wherein said retrieving means includes a viewing area for viewing diffuse reflection from said film, and irradiating means for flooding said film with electromagnetic energy from a direction selected so that specular reflection from said film does not enter said viewing area.

7. The system as defined in claim 6 wherein said retrieving means further includes a scanning system located in said viewing area for scanning said film and developing an electrical signal corresponding to the diffuse reflected electromagnetic energy from said film.

8. The system as defined in claim 7 further characterized by the addition of a lens system located between said source and said substrate for focusing said electromagnetic energy at the interface between said substrate and film.

9. The system as defined in claim 8 wherein said electromagnetic energy is a coherent parallel ray beam of laser energy.

10. The system as defined in claim 1 wherein said retrieving means includes an irradiating means for flooding said film with electromagnetic energy and a surface located in the path of specular reflection from said film so that the energy from said irradiating means reflected from portions of the film in the first state strike said surface, and energy from said irradiating means which is reflected from regions of said film in the second state do not result in a significant amount of energy striking said surface, thereby producing a pattern corresponding to said selected regions.

11. The system as defined in claim 10 wherein said surface is a screen for displaying energy impinging thereon from said irradiating means.

12. The system as defined in claim 10 wherein said surface is composed of an electromagnetic radiation sensitive material for recording the energy impinging thereon from said irradiating means.

13. The system as defined in claim 1 wherein said retrieving means includes irradiating means for flooding said film with electromagnetic energy of a frequency capable of being transmitted through regions of said film in the first state and a surface located in the path of said energy from said irradiating means transmitted through said film so that energy from said irradiating means passing through regions of said film in the second state strike said surface, and energy from said irradiating means striking regions of said second film in the second state are diffusely reflected therefrom preventing said energy from reaching said surface.

14. The system as defined in claim 13 wherein said surface is a screen for displaying energy impinging thereon from said irradiating means.

15. The system as defined in claim 13 wherein said surface is composed of an electromagnetic radiation sensitive material for recording the energy impinging thereon from said irradiating means.

16. The system as defined in claim 1 further characterized by the addition of means for varying the amount of diffuse reflection produced by regions of said film in said second state.

17. The system as defined in claim 10 further characterized by the addition of means for varying the amount of diffuse reflection produced by regions of said film in said second state, whereby gray scale is produced in said pattern corresponding to said selected regions.

18. The system as defined in claim 13 further characterized by the addition of means for varying the amount of diffuse reflection produced by regions of said film in said second state, whereby gray scale is produced in said pattern corresponding to said selected regions.

* * * * *